Nov. 10, 1942.  R. F. HLAVATY  2,301,543
VARIABLE SPEED AND ROCKING MECHANISM
Filed Sept. 29, 1941  6 Sheets-Sheet 1
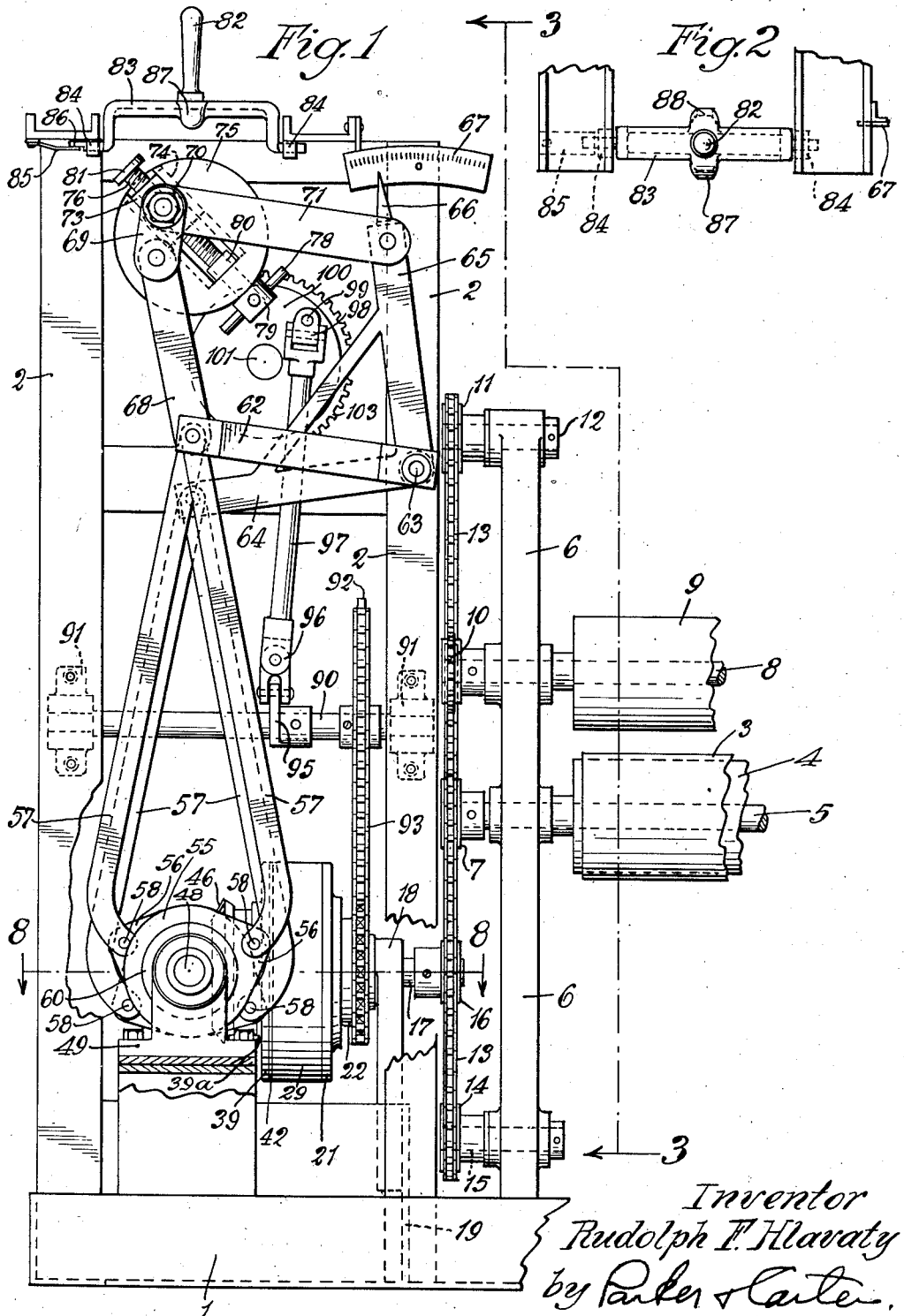
Inventor
Rudolph F. Hlavaty
by Parker & Carter
Attorneys

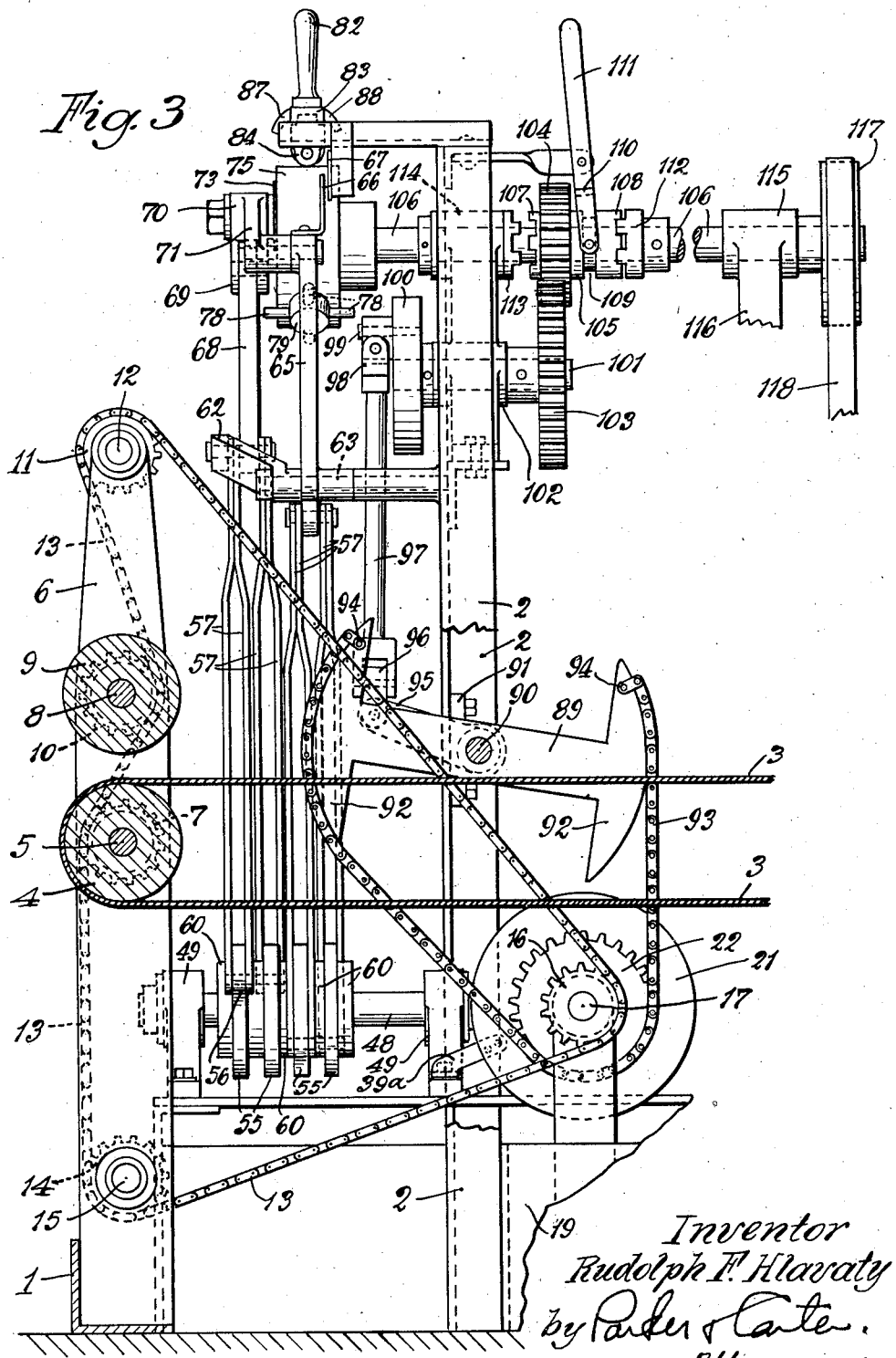

Nov. 10, 1942.  R. F. HLAVATY  2,301,543
VARIABLE SPEED AND ROCKING MECHANISM
Filed Sept. 29, 1941  6 Sheets-Sheet 3
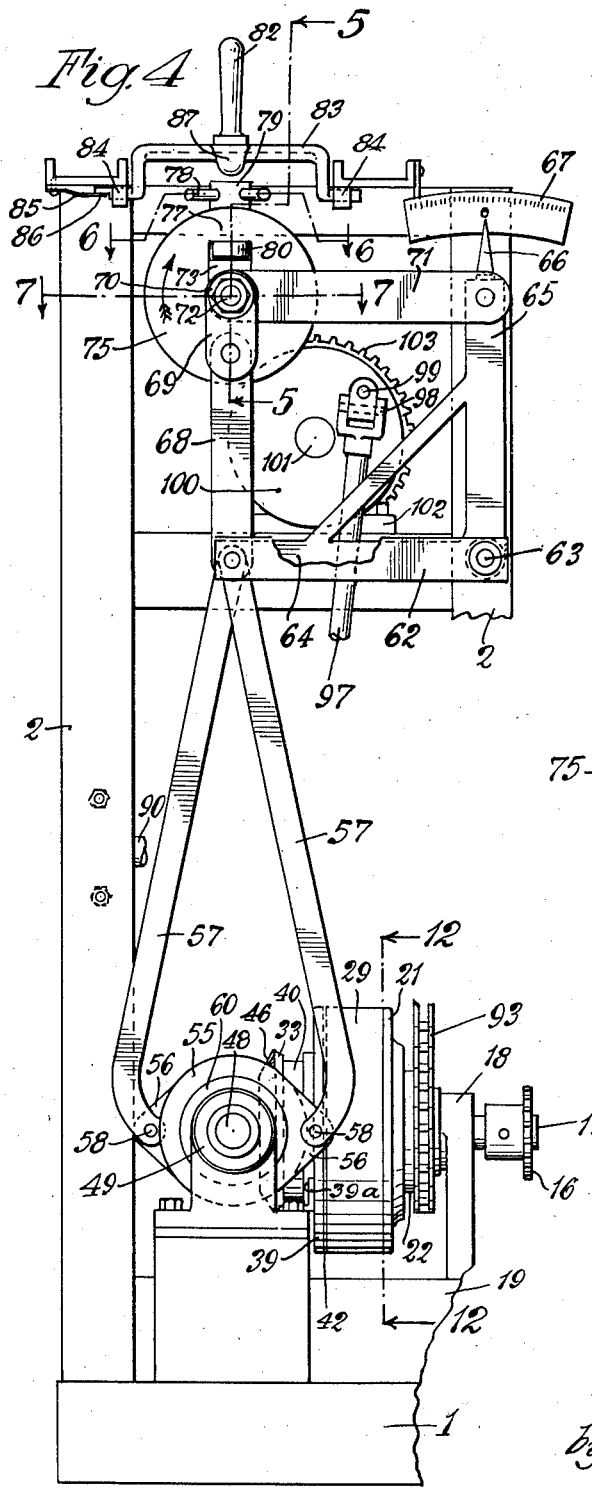
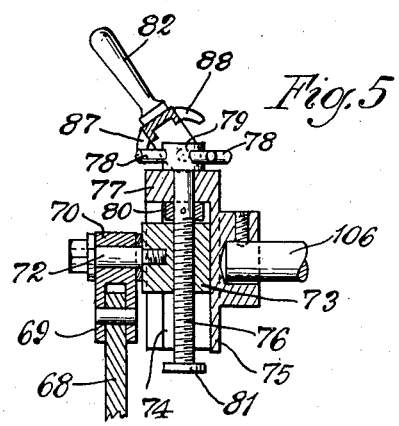
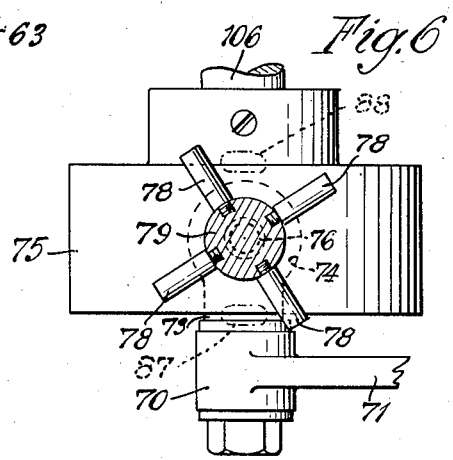
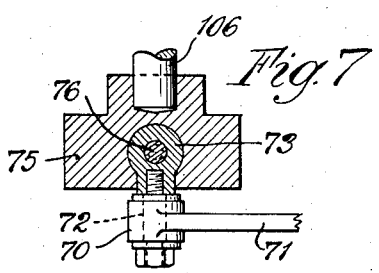
Inventor
Rudolph F. Hlavaty
by Parker & Carter
Attorneys Nov. 10, 1942.          R. F. HLAVATY                2,301,543
            VARIABLE SPEED AND ROCKING MECHANISM
                Filed Sept. 29, 1941           6 Sheets-Sheet 4
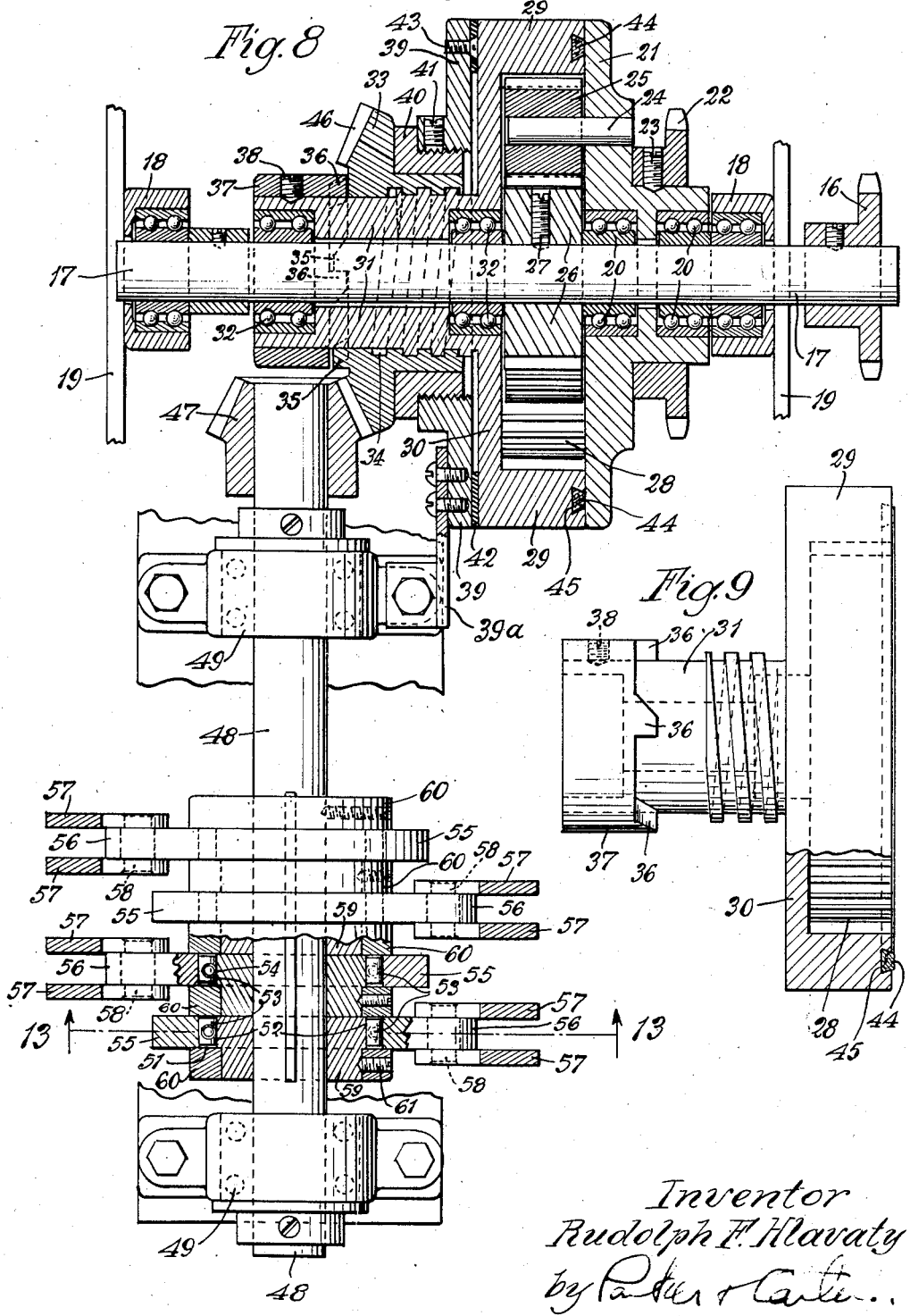
Inventor
Rudolph F. Hlavaty
by Parker & Carter
  Attorneys.

Nov. 10, 1942.    R. F. HLAVATY    2,301,543
VARIABLE SPEED AND ROCKING MECHANISM
Filed Sept. 29, 1941    6 Sheets-Sheet 5
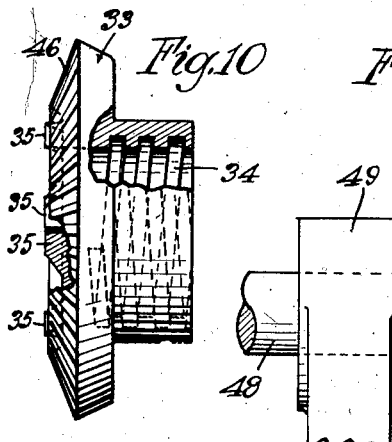
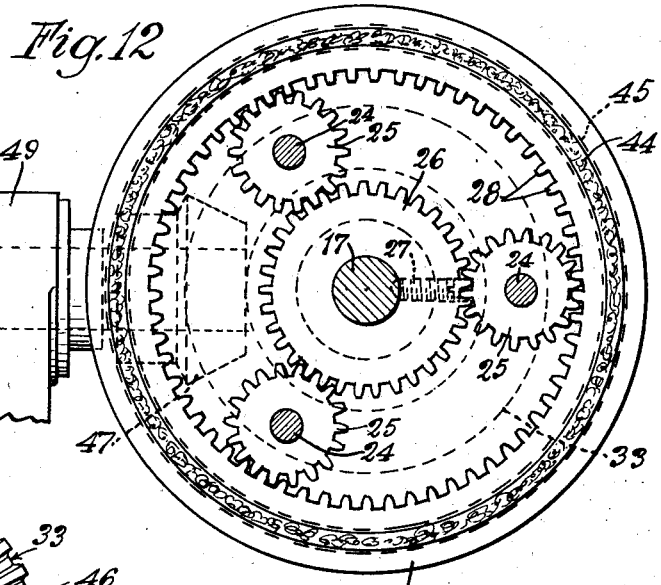
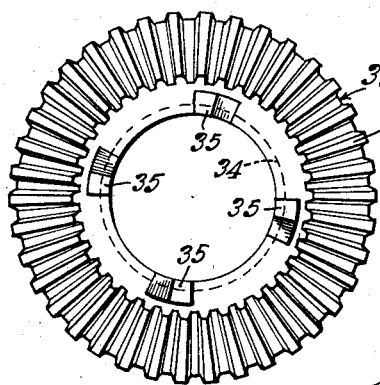
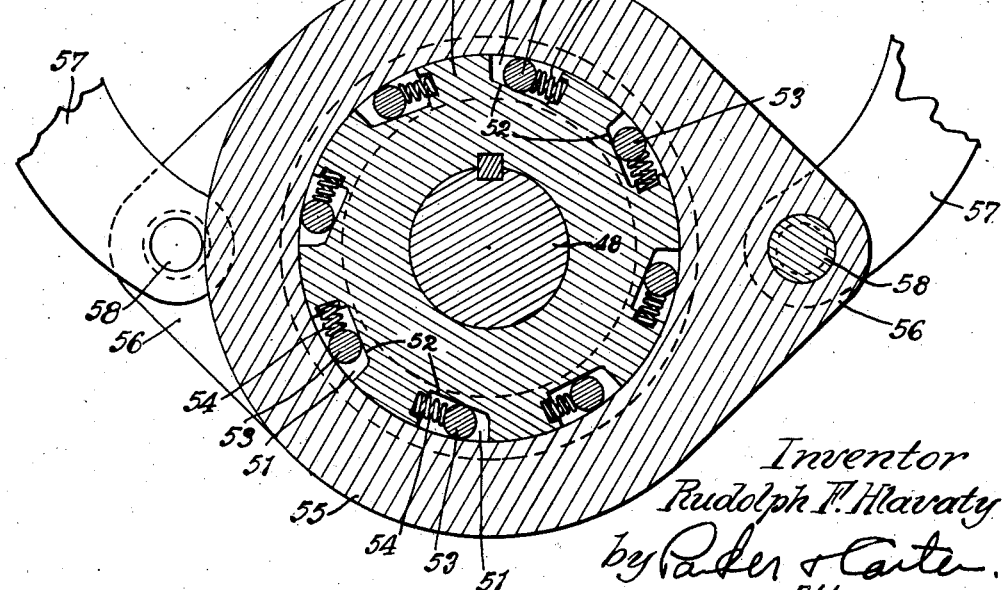
Inventor
Rudolph F. Hlavaty
by Parker & Carter
Attorneys.

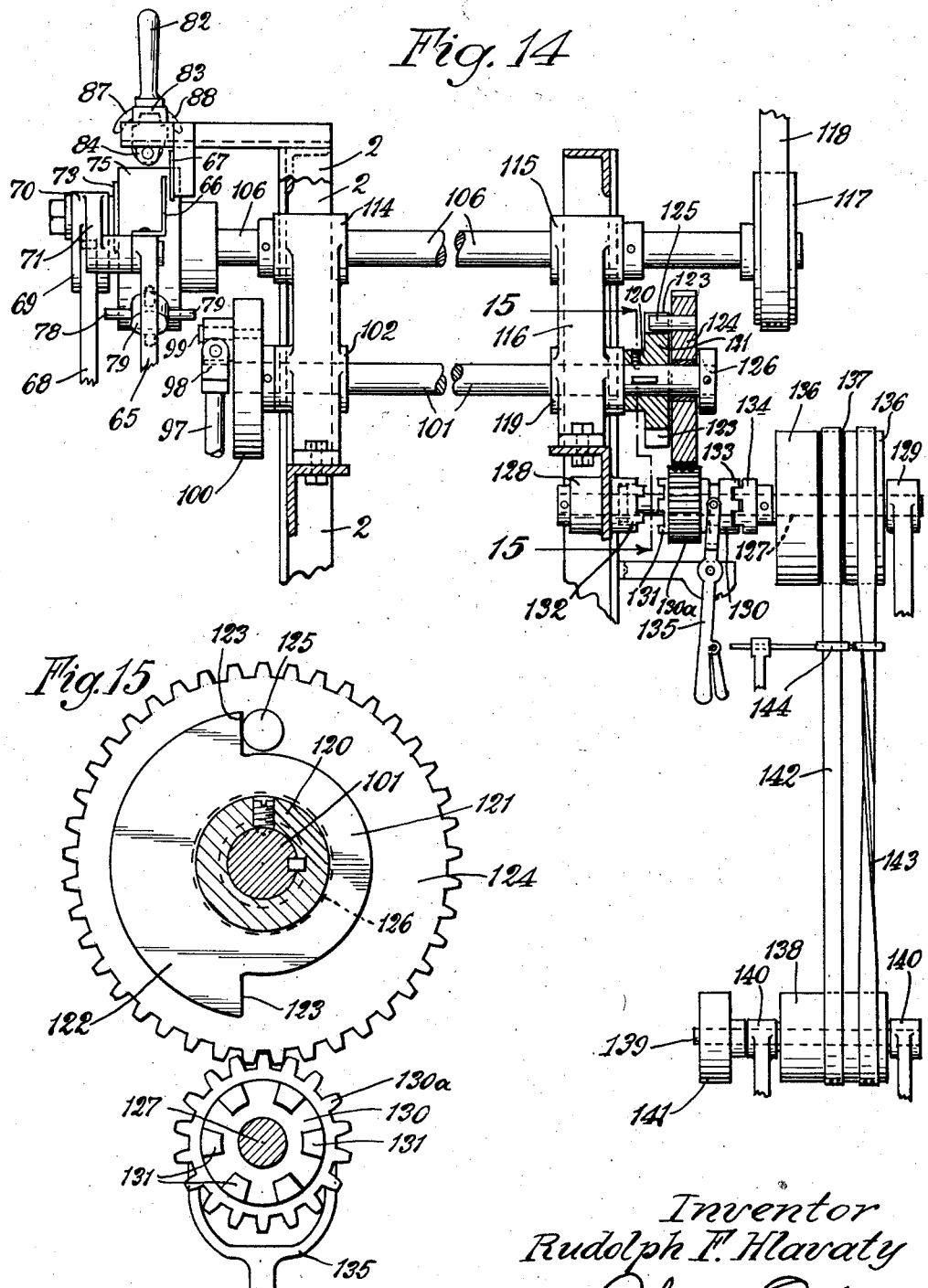

Patented Nov. 10, 1942

2,301,543

UNITED STATES PATENT OFFICE 2,301,543

VARIABLE SPEED AND ROCKING MECHANISM

Rudolph F. Hlavaty, Cicero, Ill.

Application September 29, 1941, Serial No. 412,816

20 Claims. (Cl. 74—117)

This invention relates to a driving apparatus and primarily to a variable speed drive. It may include also a rocking means inserted in the drive. It has for one object to provide means for varying the speed of a drive while the drive is in motion. It has for another object to provide a drive into which a back-and-forth movement may be introduced, in addition to the main driving movement, so that the element which is driven—for example, a conveyor belt—has a main movement in one direction, and has in addition a back-and-forth movement, so that it moves in its main direction not directly, but by moving forwardly a given distance and backwardly a lesser distance, and repeating this back-and-forward movement as long as is desired.

The drive is illustrated here as applied to a conveyor belt, but may be applied to an apron, a screen, a link, or a sectional apron, or a band or a belt or any member which is to be moved at variable speeds and which may be moved in a straight-away direction or in a step by step, back and forth movement. The invention is not limited to the association of the drive with any one of the members or types of members indicated, and it may be applied wherever a variable speed drive is required, and it may also be applied wherever such a drive associated with a back and forth movement is required.

Another object is to provide a drive which has only a back-and-forth movement, without any main conveying or continuous movement.

Another object is to provide a drive which may be varied while in operation from a zero speed to any speed within its total limit of variation.

Other objects will appear from time to time throughout the specification and claims.

This invention is illustrated more or less diagrammatically in the accompanying drawings, wherein:

Figure 1 is a side elevation, with parts broken away and parts omitted, illustrating one form of the drive applied to a conveying mechanism.

Figure 2 is a fragmentary plan view of the control apparatus.

Figure 3 is a transverse vertical section taken at line 3—3 of Figure 1.

Figure 4 is an elevation with parts omitted and parts broken away, showing the apparatus of Figure 1 in the zero position of adjustment.

Figure 5 is a vertical section taken at line 5—5 of Figure 4, showing the control handle in one position of adjustment.

Figure 6 is a horizontal section taken at line 6—6 of Figure 4 on an enlarged scale, through a portion of the control setting means.

Figure 7 is a horizontal, transverse sectional detail taken at line 7—7 of Figure 4.

Figure 8 is a horizontal section on an enlarged scale taken at line 8—8 of Figure 1.

Figure 9 is a detail in elevation, with parts broken away and parts in section, showing one of the elements of the coupling shown in Figure 8.

Figure 10 is an elevation with parts broken away and parts in section, of one of the gear members of the drive.

Figure 11 is an end elevation of the members shown in Figure 10.

Figure 12 is a transverse, vertical section on an enlarged scale, taken at line 12—12 of Figure 4.

Figure 13 is a transverse, vertical section taken at line 13—13 of Figure 8.

Figure 14 is a view generally similar to Figure 3, but illustrating a modified form of the invention.

Figure 15 is a transverse vertical section on an enlarged scale taken at line 15—15 of Figure 14.

Like parts are indicated by like characters throughout the specification and the drawings.

In the form here shown, the invention is applied to a conveyor, and embodies mechanism which may be used for a back-and-forth movement, or for a back-and-forth movement coupled with a forward movement without any back-and-forth movement.

As illustrated the mechanism is assembled on a base member 1 from which a plurality of upright members 2, 2 extend to carry various parts of the assembly and the drive. Suitable frame or supporting members will, of course, be provided, and their details form no essential part of the invention and the description of them is reduced as much as possible to avoid confusion. The invention does not reside in the details of the frame or housing construction.

As shown in the drawings, a conveyor belt 3 is positioned about a pulley 4, which is carried on a shaft 5, the shaft being mounted in suitable bearings in an upright member 6, of which at least two would be provided but of which only one is shown, for purposes of simplification. Fixed on the shaft 5 is a sprocket 7. Carried in suitable bearings in the member 6 is a second shaft 8, on which a pulley 9 is mounted, and the shaft 8 carries a second sprocket 10. The pulley 9 may be considered as a pulley or as an ironing or flattening roller designed to contact the material which passes over the conveyor belt 3. A third sprocket 11 is mounted in a stub shaft 12 carried in suitable bearings on the member 6. A chain 13 passes about and engages the three sprockets mentioned, and may also engage a fourth sprocket 14, carried on a stub shaft 15, which might be a take-up mechanism. Any of the pulleys or sprockets may be adjustable, and the details of their construction form no essential part of the invention. The chain 13 is engaged about a driving sprocket 16 on a drive shaft 17. The shaft 17 is the main driving shaft. It is supported in anti-friction bearings 18—18, which are carried in suitable frame or supporting members 19—19. Mounted on the shaft 17 by means of anti-friction bearings 20—20 is a disk-like member 21 which carries a sprocket 22, which is secured in place by a set screw 23. The disk 21 carries in the particular form here shown three pins 24, upon each of which a pinion 25 is loosely mounted for rotation. Fixed on the shaft 17 is a gear 26 which is adjustably held in position thereon by set screw 27. This gear meshes with the pinions 25 and with an internal gear 28, formed in the drum 29, which supports a part of a disk 30. The disk 30 has preferably integral with it an exteriorly threaded tubular hub 31 which is supported on the shaft 17 in anti-friction bearings 32—32.

Positioned on the tubular hub 31 and engaging its threads for limited rotation is a gear member 33 wihch is interiorly threaded as at 34 and is provided on its opposite end with lugs 35 which engage corresponding lugs 36 in a collar 37, which is removably held upon the hub 31 by a set screw 38. A certain amount of play is provided between the lugs 35 and the lugs 36.

A disc 39 which is held against movement by a member 39a, is threaded upon a collar 40 and is held in adjusted position thereon by a set screw 41. A brake band 42 is secured on the inner face of the member 39 by screws 43 or otherwise. A packing 44 is received in a suitable depression 45 in the drum 29 and bears upon the inner face of the disc 21.

As shown, the gear member 33 is bevelled as at 46 and meshes with a bevel gear 47 fixed on a shaft 48, which is carried in bearings 49.

Fixed on the shaft 48 are a plurality of discs 50 each of which has formed in its periphery a plurality of pockets or depressions 51, having inclined bottoms 52. Positioned within each depression 51 is a ball or roller 53 and a spring 54 which tends, when free to do so, to force the ball or roller upwardly along the inclined bottom 52. Positioned about each of the discs 50 is an engaging ring-like member 55 which has a round perforation fitting closely about the exterior of one of the disc members 50 and providing a surface against which the balls or rollers 53 may be fitted. Each of the members 55 has a lateral extension 56 to which a pair of arms 57 is secured for rotation by a pin 58. Each of the members 50 is provided with a spacing extension 59, about which a retainer 60 is secured in adjusted position by a set screw 61. The retainers 60 have the function of holding the balls or rollers 53 in the depressions or pockets 51. It is to be understood that the portions 59 may be integral with the portions 50 or may be made separately. It will be noticed that there are four sets of members 57, two positioned to the right, as shown in Figures 1 and 4., and two positioned to the left. As shown particularly in Figure 1, the two closest pairs of members 57 are connected at their upper end to an arm 62, which is itself pivoted as at 63 on one of the supporting members 2. The farthest or rear-most pairs of 57 is each connected at its upper end to the outer end of a lever arm 64, which is pivoted as at 63 and has an upper arm 65 which may carry an index point 66 positioned for reading a connection with an index blade 67. Extending upwardly from the outer end of the arm 62 is a link 68 which is pivoted to an arm 69 which, in the particular form here shown, is integral with a hub 70 and a lever arm 71 at right angles to the arm 69, the arm 71 being at its opposite end secured to the lever arm 65 which carries the index member 66. The hub 70 is pivoted on a pin 72 which is itself fixed in a block 73 positioned in a groove 74 in the disc 75. A screw 76 is threaded in the block 73 and passes through a portion 77 of the disc 75. The upper end of the screw 76 extends outwardly beyond the periphery of the disc 75 and has positioned in it a plurality of pins 78 by means of which it may be rotated. The pins 78 are positioned preferably in an enlarged head 79 which may be formed integrally with the screw. A collar 80 is fixed on the screw within the groove 74 of the disc 75, and the screw may also carry a limit 81 at its opposite end.

As a means for rotating the screw in order to accomplish adjustment while the drive is in operation, a handle 82 is provided on the rocker member 83 which is supported in bearings 84 and is normally held in upright position by a spring 85 engaging a flattened portion 86 of one end of the member 83. The ends of the member 83 are preferably rounded to facilitate their rotation. Preferably in line with and adjacent to the handle 82 the rocker member 83 is provided with rounded cam portions 87 and 88, the ends of which may be moved to contact the pins 78 as shown in Figure 5, or both of which may be held out of contact with the pins by the spring 85, as shown in Figures 3 and 4.

A rocking mechanism is provided and is shown primarily in Figures 1 and 3 and 4. This rocking mechanism includes a rocker arm 89 supported on a shaft 90, supported in bearings 91, 91 on uprights 2. The rocker arm 89 carries at each end segments 92, 92, which act as guides each for one end of a chain 93, the ends of the chains being secured to the segments 92 as at 94. The chain passes about a sprocket 22 mentioned above. Secured to the shaft 90 is the arm 95, which at its outer end is secured to a link 97 by a universal joint 96. At its upper end the link is secured by universal joint 98 to a pin 99, which is fixed in a disc 100, mounted on a shaft 101. An arm might be substituted for the disc. The arm shaft 101 is carried in a bearing 102, supported in one of the members 2, and at its outer end the shaft carries a gear 103, which meshes with a gear 104. The gear 104 is fixed on a hub 105, which is loose on a shaft 106. The hub 105, as shown in Figure 3, is provided with a clutch portion 107 and with an oppositely fixed clutch portion 108. It is grooved as at 109 to receive an operating member 110 which has a handle portion 111. A clutch member 112 is fixed on the shaft 106 adjacent the clutch portion 108 of the hub 105, and a fixed clutch portion 113 is secured to the bearing 114 adjacent the clutch portion 107 of the hub 105. The shaft 106 is also supported in a bearing 115 carried by an arm 116, and has at its outer end a pulley or gear 117 which may be driven by a belt or chain 118 or otherwise. The shaft 106 at the end opposite the gear or pulley 117 drives the disc 75, which is secured to it.

In the form illustrated in Figure 14, the shaft 100 does not carry the clutch mechanism, and the shaft 101 is extended and supported in the frame member 118 in a suitable bearing 119. At its right-hand end the shaft 101 has fixed upon it a hub 120. Formed integrally with the hub is an arcuate member 121 which is enlarged as at 122 to provide two shoulders 123. Loose on the shaft 101 is a gear 124 which carries a pin or projection 125. A retainer 126 is fixed on the end of the shaft 101 to prevent displacement of the gear 124. A shaft 127 is carried in suitable bearings 128 and 129. A clutch member 130, with gear 130a, is slideably mounted on the shaft and has a clutch portion 131 which may engage a fixed clutch portion 132. This latter is rigidly mounted and acts as a brake for the clutch member 130 when the two are engaged. An opposite clutch portion 133 is formed on the member 130 and may engage a clutch member 134 fixed on the shaft 127. A lever 135 engages the clutch member 130 and can be used to move it to any desired position of adjustment, either for driving or for locking it. The idler pulleys 136, 136 are free on the shaft 127, and a driving pulley 137 is mounted between them and fixed to the shaft. A driving pulley 138 is mounted on a shaft 139 which is supported in bearings 140, and the shaft carries the second pulley 141. A belt 142 engages the pulley 138 and one or another of the pulleys 136 and 137. A second reversed belt 143 engages the pulley 138 and may engage one or another of the pulleys 136 and 137. An adjusting means 144 engages the belts 142 and 143 and may be moved to adjust them as desired.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

The use and operation of the invention are as follows:

The device of the first 13 figures includes a variable speed drive designed to drive a member—for example, a conveying belt—at any speed from zero to a maximum, depending upon the design of the parts. It also includes means for giving the driven member additional back and forth movement. This latter means may be in operation or it may not. When it is not in operation, the drive is straight forward in one direction. When it is in operation, the drive is back and forth. It may be merely back and forth, without any positive conveying effect, or it may be back and forth with a conveying effect in one direction. When the latter is the case, it is as though a back and forward movement were superimposed upon a straight driving movement in one direction.

The straight forward drive will first be described. The shaft 100 is driven by a belt 118 which drives the pulley 117. Obviously, the shaft might be directly driven by a motor or otherwise. The rotary member 75, which is fixed on the shaft 100, has adjustably positioned in it a block 73. This block may be moved throughout a wide range of positions of adjustment. It may, for example, be positioned with its center corresponding with the center of the shaft 100, and in that case, no turning movement will be transmitted to the main drive. When the block 73 is moved out of center with the shaft 100, some turning effect is transmitted, the amount and degree of this effect depending upon the position of adjustment of the block 73. A short link 69 is pivoted to the block 73 and at its free end is secured to a link 68. When the member 75 rotates, the link 68 is raised and lowered, and as it goes upward, it carries with it two of the members 57, as shown particularly in Figures 1 and 4. Each of the members 57 is fastened to a clutch of the type shown in detail in Figure 13, but the members 56 of this pair of clutches are reversed with respect to each other, so that when the link 68 is raised, one of the clutches engages and rotates the shaft 48, and when the link 68 goes down, the other clutch engages and rotates the shaft 48 in the same direction. Thus as the link 68 rises and falls, there is a turning effect on the shaft 48. From Figures 1 and 3 it will be seen that there is a second pair of members 57 engaging a second pair of clutches, in a manner similar to that just described. They also transmit a rotary effect to the shaft 48 upon an up and down movement, but they are so spaced with respect to the first mentioned pair of members 57 that one is down when the other is up, and they move oppositely with respect to each other. This movement is not exactly opposite in the sense that one pair starts down at the exact instant that the other starts up, but in general, the movement of one set of members 57 is related to the movement of the other set, so that one is imparting a turning effect to the shaft 48 when the other is not.

The upper ends of the members 57 of the second set are secured to a lever arm 64, which is pivoted at 63. The other end of that arm 65 is secured by a link 71 to the pivot on the block 73, and thus the lever arm 64, 65 is rotated by the rotary member 75. It will be noticed that a radius arm 62 is provided to control the direction of the movement of the lower end of the link 68.

In order to adjust the stroke or up-and-down movement of the members 57, the block 73 is adjustable, and it is desirable to adjust it while the apparatus is in motion, and this is accomplished by the structure which includes a handle 82 or a rotary member 83 with adjusting points 87 and 88. This handle, as shown particularly in Figure 5, may be moved so that one or another of the adjusting points will contact the pins 78 on the threaded bolt 76 and rotate it to the right or to the left, so as to move the block 73 in or out and to increase and decrease the stroke imparted to the members 57. The spring 85 and the flattened portion 86 cooperate to hold the adjusting handle in the inactive position, except when it is positively manipulated otherwise. A gauge or index may be fixed on the machine and associated with a needle 66 to indicate visually the setting which has been given.

Rotation of the shaft 48 is transmitted through the bevelled gear 47 to the bevelled gear 46 on the member 33, and from it to the collar 37 by means of the clutches 35 and 36, and thence through the cylindrical member 31 to the drum 29 which carries on its inner face the internal gear 28. Rotation of this gear rotates the planet gears 25, and they in turn rotate the shaft 26, which carries the pinion 18. The planet gears 24 are carried from a disc 21, which is held stationary when the rocking motion is not in operation. The conveyor is driven by a chain 13, which meshes with the sprocket 16 and with a sprocket 7 on the conveyor shaft 5. From the mechanism thus far described, it is clear that a straight forward drive is provided which is capable of accurate and wide spread adjustment as to speed, and that this adjustment can be carried out while the mechanism is in motion. While the drive is shown as applied to a belt, which may be a conveyor belt, it is not limited to that use and may be used for any purpose for which such a variable speed drive is desired.

The rocking mechanism will now be described. As shown in Figures 1 and 3, a rotor 100 is mounted on a shaft 101, which carries a gear 103, and this gear meshes with the gear 104, slideably mounted on the shaft 106 and provided with clutch means so that it may be moved into and out of engagement, and thus the gear 103 may be driven or not, as desired. When it is not to be driven, it may be locked in place by engagement of the clutch parts 107 and 113.

Mounted on the rotor 100 is a pin 99, which may be adjustable to vary the stroke imparted to the member which it drives. A link 97 is connected to the pin 99 by a universal joint, although the universal joint is not essential. At its opposite end the link 97 is secured by a second optional universal joint 96 to a lever arm 95 which is fixed on a rock shaft 90. As the rotor 100 rotates the link oscillates the rock shaft by means of the arm 95. Fixed on the rock shaft 90 are a pair of arms 89, each of which carries at its outer end a curved or arcuate member 92, and to each of these members there is secured one end of a chain 93. This chain engages a sprocket 22, which is fastened to the disc 21, upon which the planet gears 25 are supported for rotation, and rocking movement of the member 89 thus rocks the disc 21, and through it rocks or moves the planet gears back and forth.

If the straight forward drive is in operation at the time that the rocking drive is also in operation, the effect of superimposing the rocking movement on the straight forward driving movement is to augment and diminish the straight forward driving movement, and depending upon the size of the parts, the rocking movement may completely stop the straight forward drive and may actually reverse the movement of the conveyor or other member being driven by the straight forward drive, or it may merely slow down and speed up the straight forward drive. In the particular proportions here shown, the rocking movement will stop and reverse the straight forward movement, so far as the conveyor or other driven member itself is concerned, but of course the movement of the shaft 48 is not unaffected by the rocking movement of the member 21.

Braking means are provided for the rocking movement, and these include a disc 39 mounted on a ring member 40. The ring 40 is loose on the cylindrical portion of the member 33, and the disc 39 is held against rotation by the member 39a, which is secured to any fixed member in the assembly, such as a frame member, or as shown in Figure 8, to the bearing or bearing housing 49 of the shaft 48. Fixed to the disc 39 is a brake band 42 which may bear against the end of the drum 29. The rocking movement in one direction operates in the same direction as the straight-away drive, and there is a possibility that it might tend to "over-run." The braking means prevents this. When the rocking drive is rocking in the direction of the forward drive and it is reversed, the threaded portion 31 tends to rotate more rapidly than does the threaded portion of the member 33, and tends to work to the left with respect to that member from the position shown in Figure 8. When that occurs, the housing 29, which is an integral part of the member 31, moves with it slightly as the threads tighten, and the brake band 42 is compressed, and its associated parts are stopped from further rotation. This effect might be omitted and might be arranged to take place with greater or less speed and the arrangement might be reversed so that braking would take place on the opposite rocking movement. In the particular form here shown, since the clearance of the parts is slight, the braking effect acts very promptly.

In the form of the device shown, for example, in the earlier figures, the shaft 101, from which the rocking drive is driven, does not reverse. In the form shown in Figures 14 and 15, means are provided for reversing the drive of that shaft, and this is accomplished by the pulleys 136 and 137 and two belts 142 and 143, which are driven from the main driving pulley 138. This type of reversing drive is well-known, but the presence of a reversing drive in the rocking means introduces a problem which does not occur where the shaft which drives the rocking means rotates always in a single direction. The mechanism of Figures 14 and 15 provides not only for the reversal of direction in which the shaft 101 is driven, but also provides for a time lag in the reversal of the direction of the drive.

To accomplish this, the hub 120 is fixed on the shaft 101 and carries a member 122, which provides two abutments or stops 123, and the gear 124 carries a pin or an abutment 125. In one direction of rotation of the gear 124, the pin 125 contacts one of the abutments 123. If now the direction of rotation of the gear 124 is reversed, it will first move to separate the pin 125 from the abutment 123 with which it has been in contact, and then for approximately 180 degrees of movement the pin is out of contact with any abutment, and no driving effect is transmitted to the shaft 101. It is not until the pin strikes the opposite abutment that any driving effect is transmitted again to the shaft 101. The amount of play between the pin 125 and the abutments 123 or equivalent parts may be varied to any degree, depending upon the particular installation to which the drive is applied. Not only does this mechanism provide for a time lag in the operation of reversing the direction of rotation of the driven shaft 101, but it also provides an impact or jerk, and this may be utilized to operate or to adjust various parts of the mechanism. For example, the jerk which is associated with the movement of the pin 125 when it strikes one of the abutments 123 may be sufficient to operate the brake mechanism of Figure 8 very suddenly.

I claim:

1. In combination in a variable speed drive, a shaft, a variable speed drive for driving it at variable speed, a second shaft, and means for driving it from said first shaft, and means for imparting a back-and-forth, rocking movement to said second shaft, whereby a rocking movement is super-imposed upon the main driving movement of said second shaft.

2. In combination in a variable speed drive, a shaft, a variable speed drive for driving it at variable speed, a second shaft, and means for driving it from said first shaft, a planetary gear assembly associated with said second shaft, and means for imparting a back-and-forth, rocking movement to said second shaft, whereby a rocking movement is super-imposed upon the main driving movement of said second shaft.

3. In combination in a variable speed drive, a shaft, a drive for driving it at variable speed, and means for varying said speed, a second shaft, and means for driving it from said first shaft, including a gear carrier, and means for imparting a back-and-forth, rocking movement to said second shaft, whereby a rocking movement is super-imposed upon the main driving movement of said second shaft.

4. In combination in a variable speed drive, a shaft, means for driving it at variable speed, a second shaft, and means for driving it from said first shaft, including a gear carrier, and means for imparting a back-and-forth, rocking movement to said second shaft through said gear carrier, whereby a rocking movement is super-imposed upon the main driving movement of said second shaft.

5. In combination in a variable speed drive, a shaft, means for driving it at variable speed, a second shaft, and means for driving it from said first shaft, a planetary gear assembly associated with said second shaft, and including a gear carrier, a plurality of planetary gears rotatably mounted on said carrier, and a sun gear fixed on said second shaft and meshing with said planetary gears, and means for imparting a back-and-forth, rocking movement to said second shaft through said gear carrier, whereby a rocking movement is super-imposed upon the main driving movement of said second shaft.

6. In a variable speed drive, means for imparting a main rotation in a single direction to a member, and means for imparting a rocking movement to said member, said drive including a primary shaft, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

7. In a variable speed drive, means for imparting a main rotation in a single direction to a member, and means for imparting a rocking movement to said member, the rocking movement being super-imposed upon the main rotary movement, said drive including a primary shaft, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

8. In a variable speed drive, means for imparting a main rotation in a single direction to a member, and means for imparting a rocking movement to said member, said drive including a primary shaft, a plurality of clutch members fixed to said shaft, and a movable clutch member associated with each of said fixed clutch members, and means for moving said second clutch members, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

9. In a variable speed drive, means for imparting a main rotation in a single direction to a member, and means for imparting a rocking movement to said member, said drive including a primary shaft, a plurality of clutch members fixed to said shaft, and a movable clutch member associated with each of said fixed clutch members, and means for moving said second clutch members in pairs, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

10. In a variable speed drive, means for imparting a main rotation in a single direction to a member, and means for imparting a rocking movement to said member, said drive including a primary shaft, a plurality of clutch members fixed to said shaft, and a movable clutch member associated with each of said fixed clutch members, and means for moving said second clutch members, and means for varying the speed with which said clutch members are moved, a gear on said primary shaft, a secondary shaft, a gear positioned thereabout, and meshing with the first-mentioned gear, and a gear carrier, a plurality of planetary gears mounted for rotation on said carrier, and means for rocking said carrier, whereby said planetary gears are moved back and forth.

11. In a variable speed drive, means for imparting a main rotation in a single direction to a member, and means for imparting a rocking movement to said member, the rocking movement being superimposed upon the main rotary movement, said drive including a primary shaft, a plurality of clutch members fixed to said shaft, and a movable clutch member associated with each of said fixed clutch members, and means for moving said second clutch members, and means for varying the speed with which said clutch members are moved, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

12. In a variable speed drive, means for imparting a main rotation in a single direction to a member, and means for imparting a rocking movement to said member, the rocking movement being superimposed upon the main rotary movement, said drive including a primary shaft, a plurality of clutch members fixed to said shaft, and a movable clutch member associated with each of said fixed clutch members, and means for moving said second clutch members in pairs, and means for varying the speed with which said clutch members are moved, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

13. In a variable speed drive, means for imparting a main rotation in a single direction to a member, and means for imparting a rocking movement to said member, said drive including a primary shaft, a plurality of clutch members fixed to said shaft, and a movable clutch member associated with each of said fixed clutch members, and means for moving said second clutch members, and means for varying the speed with which said clutch members are moved, said means including links attached to said clutch members, and a drive for said links including a rotary member, and an attaching part adjustably mounted on said rotary member for movement toward and away from its axis of rotation, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

14. In a variable speed drive, means for imparting a main rotation in a single direction to a member, and means for imparting a rocking movement to said member, said drive including a primary shaft, a plurality of clutch members fixed to said shaft, and a movable clutch member associated with each of said fixed clutch members, and means for moving said second clutch members, and means for varying the speed with which said clutch members are moved, and means including links attached to said clutch members, and a drive for said links including a rotary member, and an attaching part adjustably mounted on said rotary member for movement toward and away from its axis of rotation, and means for effecting adjustment at said attachment part, while the last-mentioned rotary member is in movement, a gear on said primary shaft, a secondary shaft, a gear positioned thereabout and meshing with the first-mentioned gear, and a gear carrier, a plurality of planetary gears mounted for rotation on said carrier, and means for rocking said carrier, whereby said planetary gears are moved back and forth.

15. In a variable speed drive, means for imparting a main rotation in a single direction to a member, and means for imparting a rocking movement to said member, said drive including a primary shaft, a gear on said primary shaft, a secondary shaft, a gear positioned thereabout and meshing with the first-mentioned gear, a planetary gear assembly positioned about said secondary shaft, and including a housing and an internal gear carried thereby, said housing being positively driven from said first shaft, and a sun gear fixed on said shaft within said housing, and a gear carrier, a plurality of planetary gears mounted for rotation on said carrier, and means for rocking said carrier, whereby said planetary gears are moved back and forth.

16. In a variable speed drive, means for imparting a main rotation in a single direction to a member, and means for imparting a rocking movement to said member, said drive including a primary shaft, a gear on said primary shaft, a secondary shaft, a gear positioned thereabout and meshing with the first-mentioned gear, a planetary gear assembly positioned about said secondary shaft, and including a housing and an internal gear carried thereby, said housing being positively driven from said first shaft, and a sun gear fixed on said shaft within said housing, and a gear carrier, a plurality of planetary gears mounted for rotation on said carrier and meshing with said sun gear, and means for rocking said carrier, whereby said planetary gears are moved back and forth.

17. In a variable speed drive, means for imparting a main rotation in a single direction to a member, and means for imparting a rocking movement to said member, the rocking movement being superimposed upon the main rotary movement, said drive including a primary shaft, a gear on said primary shaft, a secondary shaft, a gear positioned thereabout and meshing with the first-mentioned gear, a planetary gear assembly positioned about said secondary shaft, and including a housing and an internal gear carried thereby, said housing being positively driven from said first shaft, and a sun gear fixed on said shaft within said housing, and a gear carrier, a plurality of planetary gears mounted for rotation on said carrier and meshing with said sun gear, and means for rocking said carrier, whereby said planetary gears are moved back and forth.

18. In a variable speed drive, means for imparting a main rotation in a single direction to a member, and means for imparting a rocking movement to said member, the rocking movement being super-imposed upon the main rotary movement, said drive including a primary shaft, a plurality of clutch members fixed to said shaft, and a movable clutch member associated with each of said fixed clutch members, and means for moving said second clutch members in pairs, and means for varying the speed with which said clutch members are moved, said means including links attached to said clutch members, and a drive for said links including a rotary member, and an attaching part adjustably mounted on said rotary member for movement toward and away from its axis of rotation, and means for effecting adjustment at said attachment part, while the last-mentioned rotary member is in movement, a gear on said primary shaft, a secondary shaft, a gear positioned thereabout and meshing with the first-mentioned gear, a planetary gear assembly positioned about said secondary shaft and including a housing and an internal gear carried thereby, said housing being positively driven from said first shaft, and a sun gear fixed on said shaft within said housing, and a gear carrier, a plurality of planetary gears mounted for rotation on said carrier and meshing with said sun gear, and means for rocking said carrier, whereby said planetary gears are moved back and forth.

19. In a drive, a rotary member and main driving means for imparting rotation to it, and means for imparting rocking movement to said rotary member, said rocking movement being simultaneous to and in addition to said rotary movement, said main driving means comprising a plurality of clutch members associated with said rotary member, said clutch members, when moved in one direction, being effective to move said rotary member, and means for moving pairs of said clutch members together and for adjusting the speed at which said clutch members are members are moved during their movement, said rocking means comprising a clutch, and a planetary gear inserted in said main drive, and means for imparting a rocking movement to said planetary gear.

20. In combination in a drive, a shaft, and means for driving said shaft at variable speed, and means in addition to such driving means for imparting to the drive a back-and-forward movement,

RUDOLPH F. HLAVATY.